United States Patent
Hug

(10) Patent No.: US 12,077,151 B2
(45) Date of Patent: Sep. 3, 2024

(54) METHOD FOR OPERATING A CAR PARK PARKING SYSTEM OF A CAR PARK, AND CAR PARK PARKING SYSTEM

(71) Applicant: MERCEDES-BENZ GROUP AG, Stuttgart (DE)

(72) Inventor: Tobias Hug, Magstadt (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 218 days.

(21) Appl. No.: 17/800,978

(22) PCT Filed: Jan. 27, 2021

(86) PCT No.: PCT/EP2021/051792
§ 371 (c)(1),
(2) Date: Aug. 19, 2022

(87) PCT Pub. No.: WO2021/164998
PCT Pub. Date: Aug. 26, 2021

(65) Prior Publication Data
US 2023/0072922 A1 Mar. 9, 2023

(30) Foreign Application Priority Data
Feb. 20, 2020 (DE) .................... 10 2020 001 085.7

(51) Int. Cl.
*B60W 30/06* (2006.01)
*B60W 60/00* (2020.01)
*G08G 1/14* (2006.01)

(52) U.S. Cl.
CPC ........ *B60W 30/06* (2013.01); *B60W 60/0025* (2020.02); *G08G 1/14* (2013.01)

(58) Field of Classification Search
None
See application file for complete search history.

(56) References Cited

U.S. PATENT DOCUMENTS

| 11,614,738 B2 * | 3/2023 | Mukaiyama ......... G08G 1/0137 701/23 |
| 2006/0212344 A1 | 9/2006 | Marcus et al. |

(Continued)

FOREIGN PATENT DOCUMENTS

| CN | 101101648 A | 1/2008 |
| CN | 203055182 U | 7/2013 |

(Continued)

OTHER PUBLICATIONS

Decision of Refusal dated Jan. 10, 2024 in related/corresponding JP Application No. 2022-547811.

(Continued)

*Primary Examiner* — Lail A Kleinman
(74) *Attorney, Agent, or Firm* — PATENT PORTFOLIO BUILDERS PLLC

(57) ABSTRACT

A method for operating a car park parking system of a car park involves determining a current state of occupancy of the car park and assigning a quick-access parking space to a motor vehicle to be parked depending on the determined state of occupancy. The motor vehicle to be parked is brought driverlessly to the assigned quick-access parking space. An information message is communicated to a user of the motor vehicle to be parked depending on a decision criterion. The information message proposes a pick-up time, and, following acceptance of the proposed pick-up time by the user, the motor vehicle to be parked is brought driverlessly from the quick-access parking space to a long-stay parking space.

10 Claims, 3 Drawing Sheets

(56) References Cited

U.S. PATENT DOCUMENTS

| | | | |
|---|---|---|---|
| 2011/0004507 A1* | 1/2011 | Potkonjak | G06Q 30/02 |
| | | | 705/13 |
| 2017/0351267 A1* | 12/2017 | Mielenz | G05D 1/0212 |
| 2018/0374349 A1* | 12/2018 | Mowatt | G08G 1/14 |
| 2021/0046977 A1* | 2/2021 | Zhang | B60W 10/20 |

FOREIGN PATENT DOCUMENTS

| | | | |
|---|---|---|---|
| CN | 103778802 A | | 5/2014 |
| CN | 105094094 A | | 11/2015 |
| CN | 106023641 A | | 10/2016 |
| CN | 107207005 A | | 9/2017 |
| DE | 102013222071 A1 | | 4/2015 |
| DE | 102014224454 A1 | | 6/2016 |
| DE | 102015201205 A1 | | 7/2016 |
| DE | 102016219698 A1 | * | 4/2018 |
| DE | 102017204162 A1 | | 9/2018 |
| EP | 3495588 A1 | | 6/2019 |
| JP | 2007219738 A | | 8/2007 |
| JP | 2016006605 A | | 1/2016 |
| JP | 2018005532 A | | 1/2018 |

OTHER PUBLICATIONS

Notice of Reasons for Refusal dated Sep. 26, 2023 in related/corresponding JP Application No. 2022-547811.
International Search Report mailed Apr. 29, 2021 in related/corresponding International Application No. PCT/EP2021/051792.
Office Action created Nov. 5, 2020 in related/corresponding DE Application No. 10 2020 001 085.7.
Written Opinion mailed Apr. 29, 2021 in related/corresponding International Application No. PCT/EP2021/051792.
Office Action dated Mar. 25, 2024 in related/corresponding Chinese Application No. 202180015067.0.

* cited by examiner

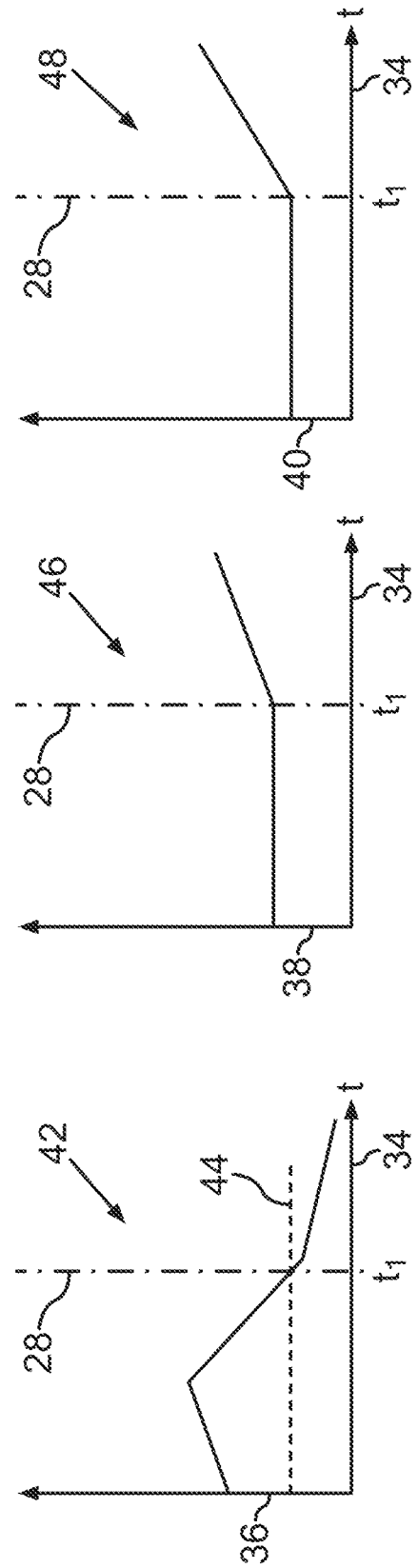

METHOD FOR OPERATING A CAR PARK PARKING SYSTEM OF A CAR PARK, AND CAR PARK PARKING SYSTEM

BACKGROUND AND SUMMARY OF THE INVENTION

Exemplary embodiments of the invention relate to a method for operating a car park parking system of a car park for multiple motor vehicles, as well as to a car park parking system.

Car parks are known from the prior art that allow so-called automated valet parking, which describes the autonomous parking and removal of motor vehicles in/from parking spaces. Here, the motor vehicle can be dropped off, for example, at a handover zone and then parked autonomously by the car park parking system. Pick-up is initiated by the user, for example via a remote control device, for example a smartphone. The motor vehicle is then driven autonomously from the parking space in the car park to a handover zone and can be picked up by the driver. The car park parking system should be capable here of returning the motor vehicle to the handover zone always within a short space of time without a superordinate vehicle management system. In order to achieve maximum utilization of the capacity of the available parking area in urban environments by means of such a system, it may be expedient to use an intelligent management system, which allows for the most accurate estimation possible of the pick-up time of the various motor vehicles.

DE 10 2015 201 205 proposes a method for optimizing the utilization of a parking area. In that case, vehicles that are to be parked in the parking area are each assigned a parking space, wherein the vehicles autonomously drive to their assigned parking spaces. Furthermore, vehicles may change parking space in order to allow improved utilization of the available parking spaces or a quicker availability of the vehicle, whereby optimized utilization of the parking area is achieved on the whole. Here, an available range of the vehicles in question is first determined, and the assignment of a particular parking space and/or a possible change of the parking area are made dependent on the available range of the individual vehicles. The available range of a vehicle is described in particular by a remaining fuel volume or a state of charge of the vehicle.

DE 10 2013 222 071 A1 proposes a parking space management system for a valet-parking function, in which the time of initiation of the automatic process of removing a vehicle from a parking space is optimized. For this purpose, it is estimated or explicitly predefined when the driver of a parked vehicle will be at a predefined pick-up position so that the parking space management system according to the invention can communicate to the vehicle to be picked up when the parking space management system has to start the process of removal from the parking space, in order to be at the pick-up position in good time. The parking space management system has for this purpose a computing unit that calculates an optimized starting time for the initiation of the process of removing the vehicle from the parking space depending on a predefined pick-up time. In this case, trajectories for removing the vehicle from the parking space can be taken into account as a function of the position of the assigned parking space and the pick-up position. It is therefore possible to calculate the time period which the vehicle requires to travel along the trajectory for the removal of the vehicle from an assigned parking space to the pick-up position.

DE 10 2016 219 698 proposes a parking space management system comprising a computing unit. The parking space management system is configured to monitor the state of occupancy of a predefined parking area and to assign a parking space to the vehicle of a user upon receipt of a parking request by the user of the vehicle by means of a communications link and to communicate position data of the assigned parking space to the vehicle by means of the communications link. In accordance with the invention, the parking space management system is configured to initiate a process of removing the vehicle from a parking space at a start time, wherein the vehicle is moved, in particular autonomously or in remote-controlled fashion, to a predefined pick-up position, and wherein the start time is calculated by the computing unit depending on a pick-up time determined on the basis of a day profile of the user.

US 2006/0212344 A1 discloses a system for an automatic parking system. The system includes a detection subsystem for detecting a state of occupancy of a vehicle parking space, wherein the detection subsystem provides a real-time state-of-occupancy signal for the vehicle parking space, wherein the state-of-occupancy signal includes an occupied mode and an unoccupied mode. The system also comprises a communications subsystem, coupled to the detection subsystem, for transmitting the state-of-occupancy signal. The system also comprises a management subsystem for receiving the state-of-occupancy signal, wherein the management subsystem processes a parking transaction for the vehicle parking space automatically upon a mode change of the state-of-occupancy signal. A method includes automatically opening a parking transaction upon detection of an occupation of a parking space or area and automatically closing a parking transaction upon detection of a vacation of a parking space or area. Additional elements may include an authorization system and a notification system. The methods include identified parking methods for identifying automatically changes in a state of occupancy of one or more parking spaces or areas and automatically initiating/closing, as appropriate, parking transactions responsive to correspondingly identified changes in state-of-occupancy signals associated with each of the one or more parking spaces, as well as methods for producing and using the disclosed systems.

Exemplary embodiments of the present invention are directed to a method and a car park parking system by means of which an improved utilization of the capacity of the car park can be realized.

One aspect of the invention relates to a method for operating a car park parking system of a car park for multiple motor vehicles, in which method a current state of occupancy of the car park is determined by means of an electronic computing device of the car park parking system, and in which a quick-access parking space is assigned from multiple parking spaces of the car park to a motor vehicle to be parked depending on the determined state of occupancy, wherein the motor vehicle to be parked is brought driverlessly to the assigned quick-access parking space.

It is provided that an information message is communicated by means of the electronic computing device to a user of the motor vehicle to be parked depending on a decision criterion, wherein the information message proposes to the user a pick-up time determined by the electronic computing device, and, following acceptance of the pick-up time by the user, the motor vehicle is brought driverlessly from the quick-access parking space to a long-stay parking space.

It is thus made possible that an improved car park capacity utilization can be provided. Efficient vehicle management for an automated valet parking system, which corresponds to the car park parking system, is thus proposed, which makes it possible, additionally for the operator, to perform a planning operation when the individual motor vehicles are required again by the customer and further parking spaces are vacated, whereby in particular additional parking space can be made available for the car park operator at peak demand times. At the same time, it is made possible to offer a bonus system for the customers if they agree not to require their motor vehicle for a defined time or to leave their motor vehicle in the car park for a defined time. As a result of this approach, it is possible to create an optimum for the vehicle users by way of additional parking spaces or bonuses, and to achieve an improved utilization of the capacity of the car park for the car park operator.

In other words, it is proposed, in particular, that a car park equipped with an automated valet parking system is permanently informed of how many parking spaces are currently still available. The capacity utilization can thus be monitored continuously. If, for example, at a peak time, for example on a Saturday, the number of free parking spaces in a town center drops below a specific number, users seeking currently to have their vehicle parked in the car park by means of the automated valet parking system can then be contacted by the system. Based on the statistical data, detected by the automated valet parking system, relating to the available parking spaces over time, a specific proposal can be presented to the customer. A specific time is hereby proposed to the customer wishing to leave their vehicle in the car park, for example until Monday 10:00 am. The customer, for example, receives a bonus for this in the form of parking time or a discount on the parking fee. The number of customers contacted is increased or reduced depending on the level of acceptance of the offer by the customers. The motor vehicles of the customers accepting such an offer or confirming a specific parking time can now be parked by the system in a less easily accessible area.

In particular, it is thus made possible that, by means of the car park parking system, in particular at peak times, additional parking space can be offered for further customers by packing the parking spaces or the parking area more densely and enticing the customers to consider this offer by way of an incentivization. The car park parking system continues to monitor the utilization of the capacity of the car park or, following expiry of the deadline agreed with the customer, arranges for an autonomous moving of their vehicle to standard parking spaces, which allow the motor vehicles to be recalled by the customers within a matter of minutes.

In particular, it can be provided that, if, for example, the car park is already "overfilled", it is offered to the user that the motor vehicle be brought to a long-stay parking space and a predetermined pick-up time is proposed to the user. In other words, the motor vehicle is not brought directly to an assigned quick-access parking space, but is brought directly to a long-stay parking space.

In particular, the motor vehicles are brought to the corresponding parking spaces at least partly autonomously, in particular fully autonomously. For this purpose, the motor vehicle can be of autonomous configuration, however, conveyor belts and lifts can also be installed within the car park so that autonomous movement of the motor vehicle can be initiated by means of the car park.

The term "motor vehicle to be parked" in the present context shall be understood to mean the motor vehicle dropped off by the user. The motor vehicle to be parked thus may be parked already, for example, in a quick-access parking space or in a long-stay parking space, or may be in the process of being moved driverlessly to one of these parking spaces. The term "motor vehicle to be parked" therefore is not limited to a motor vehicle to be moved driverlessly, and instead describes merely the motor vehicle that has been dropped off by the user in the car park.

In accordance with an advantageous embodiment, when the motor vehicle to be parked is brought to a long-stay parking space, the motor vehicle is parked for a minimum parking time above a predefined parking time threshold value. In other words, a minimum parking time is predefined, so that a corresponding pick-up time is proposed reliably to the user. It is thus made possible that a distinction can be made reliably between the long-stay parking space and the quick-access parking space. For example, a motor vehicle which is parked for less than the minimum parking time is brought to a quick-access parking space and a motor vehicle that is parked for more than the minimum parking time is brought to a long-stay parking space. The utilization of the capacity of the car park can thus be improved.

It is furthermore advantageous if, with an area of the long-stay parking space the same size as that of the quick-access parking space, a larger number of motor vehicles and/or a larger motor vehicle is parked. In particular, it can be provided that nested parking is implemented, which means that the motor vehicles are parked closely together by the car park parking system so that manual removal from the parking spaces is no longer possible, since the motor vehicles are arranged closely together and for example the user would no longer be able to open the vehicle door far enough to enter the vehicle. In particular, only driverless parking and removal from a parking space by means of the car park parking system can thus be implemented. In particular, due to the nested parking, a greater parking area can be provided, so that an improved utilization of the capacity of the car park can be provided.

It is furthermore advantageous if the pick-up time is only proposed to the user from a specific number of parked motor vehicles in the car park above a number threshold value. In particular, the car park may comprise a corresponding detection device, for example, by means of which the number of parked motor vehicles can be monitored. Only if the number threshold value is exceeded, for example above a capacity utilization of 75% of the car park, is the pick-up time then proposed to the user. In other words, should the utilization of the capacity of the car park be low, the motor vehicle is brought to the quick-access parking space, so that the motor vehicle can be picked up by the user at any time. Only if the number threshold value is exceeded is the method in accordance with the invention carried out, so that the capacity of the car park can be better utilized.

Alternatively, if the number of free spaces drops below a threshold value the method can be carried out. In other words, if a number of free parking spaces is detected and if such a number drops below a predefined free space threshold value, the method can be carried out.

In accordance with a further advantageous embodiment, the pick-up time is proposed on the basis of statistical data relating to the available parking spaces depending on time. In particular, it can be provided, for example, that an average parking time of motor vehicles is determined and the pick-up time is proposed to the user depending on the determined average parking time. In particular, for example, peak times at the car park can be taken into consideration for this purpose. An improved utilization of the capacity of the car park, in particular at peak times, is thus made possible.

It is likewise advantageous if the statistical data are determined and evaluated by means of the electronic computing device on the basis of past states of occupancy in the car park. In particular, the past state of occupancy or the past states of occupancy can thus be stored accordingly in a memory device of the electronic computing device and can be evaluated accordingly. On the basis of these stored states of occupancy, it can then be determined reliably at what moment in time a pick-up time is proposed to the user. Furthermore, the pick-up time can be reliably determined. For example, the electronic computing device may have a neural network for this purpose, which network learns, on the basis of the past states of occupancy, on what days an increased customer number is to be expected and whether, for example, the parking time of the customers increases over time. The statistical data can thus be determined in a manner matched to the current situation, so that the pick-up time can be proposed reliably to the user.

In a further advantageous embodiment, the motor vehicle is brought at the pick-up time to the quick-access parking space. In particular, it is provided that the motor vehicle, at the pick-up time, is parked in the quick-access parking space. In other words, the motor vehicle can be moved already before the pick-up time, so that the motor vehicle is available for the customer in the quick-access parking space at least at the pick-up time. Alternatively, or additionally, the motor vehicle can be brought at the pick-up time into a handover area of the car park.

It is furthermore advantageous if a minimum parking time is additionally predefined to the user and it is decided by means of the electronic computing device, depending on the predefined minimum parking time, whether the motor vehicle is brought to a quick-access parking space or a long-stay parking space. For example, as the motor vehicle is parked in the handover zone, the customer can predefine a minimum parking time accordingly via a mobile terminal, for example a smartphone. Depending on this, should the minimum parking time be below a predefined threshold value for example, it can then be decided that the motor vehicle will be parked in a quick-access parking space. For example, should a parking time be above a predefined threshold value, it can thus be decided by the electronic computing device that the motor vehicle will be brought to a long-stay parking space. In particular, the current state of occupancy of the car park can be taken into consideration here. The utilization of the capacity of the car park is thus improved.

It is furthermore advantageous if a long-stay parking space within the car park and/or a long-stay parking space externally of the car park will be used as a long-stay parking space. In other words, for example a long-stay parking space in a further car park provided externally of the original car park can be used, with motor vehicles being parked in the further car park, for example, only via the automated valet parking system and being parked there in nested fashion, so that the motor vehicles are arranged closely together. Alternatively, it can be provided that the car park has both quick-access parking spaces and long-stay parking spaces, so that the motor vehicles are only moved within this car park.

A further aspect of the invention relates to a car park parking system of a car park for multiple motor vehicles, comprising at least one electronic computing device, wherein the car park parking system is configured to carry out a method according to the aspect above. In particular, the method is carried out by means of the car park parking system. An electronic computing device of the car park parking system for carrying out the method has, in particular, a corresponding computer program, by means of which the steps of the method can be carried out.

Advantageous embodiments of the method are to be considered to be advantageous embodiments of the car park parking system. The car park parking system for this purpose has car park features that allow the method to be carried out or an advantageous embodiment thereof.

Further advantages, features and details of the invention will become clear from the following description of preferred exemplary embodiments and with reference to the drawings. The features and combinations of features described above in the description as well as those described hereinafter in the figure description and/or features and combinations of features shown in isolation in the figures can be used in each case not only in the stated combination, but also in other combinations or in isolation, without departing from the scope of the invention.

BRIEF DESCRIPTION OF THE DRAWING FIGURES

In the figures:

FIG. 3 shows three time-dependent graphs which describe an embodiment of the method.

Like or functionally like elements are provided with the same reference signs in the figures.

DETAILED DESCRIPTION

Figure 1:
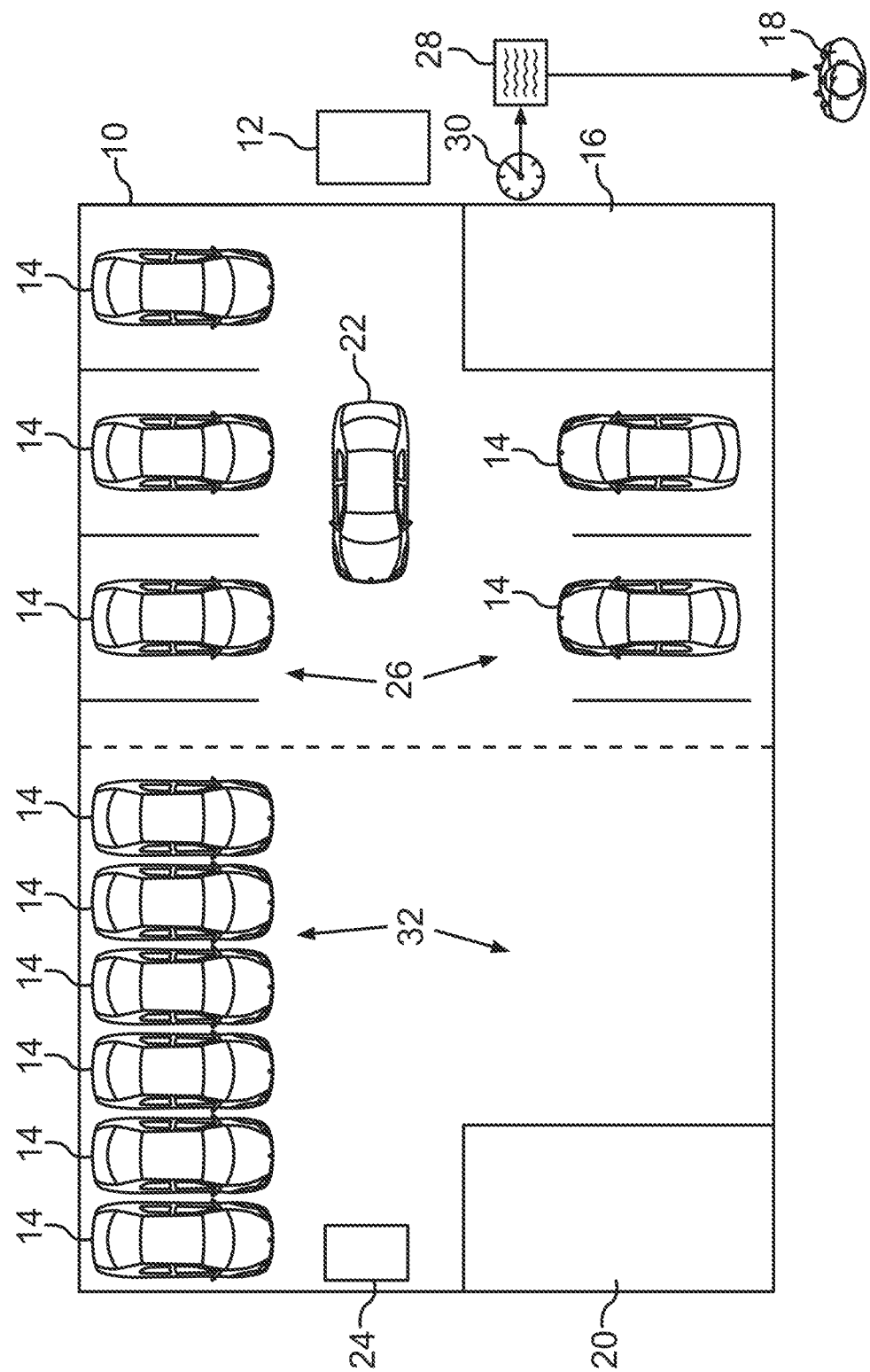
FIG. 1 shows a schematic plan view of a car park with an embodiment of a car park parking system.

FIG. 1 shows, in a schematic plan view, an embodiment of a car park 10 with an embodiment of a car park parking system 12. The car park 10 comprises multiple parking spaces, wherein the multiple parking spaces are provided for multiple motor vehicles 14, 22. The car park 10 is configured as a so-called automated valet parking car park. In other words, the motor vehicles 14, 22 are parked driverlessly within the car park 10. In particular, the car park 10 for this purpose may have a handover region 16, where a user 18 can drop off the motor vehicle 14, 22, wherein the motor vehicle 14, 22 is then brought to one of the parking spaces. The car park 10 may also have a pick-up region 20, where the motor vehicle 14, 22 can be picked up by the user 18.

In the present exemplary embodiment, a motor vehicle 22 to be parked is assigned to the user 18. In other words, the user 18 is, for example, the owner or proprietor of the motor vehicle 22 to be parked. The motor vehicle 22 is thus a motor vehicle 22 to be parked. The motor vehicles 14 are motor vehicles 14 that are already parked and that were parked independently of the user 18.

In the method for operating the car park parking system 12 of the car park 10 for the multiplicity of motor vehicles 14, a current state of occupancy of the car park 10 is determined by means of an electronic computing device 24 of the car park parking system 12, and a quick-access parking space 26 is assigned from multiple parking spaces of the car park 10 to the motor vehicle 22 to be parked depending on the determined state of occupancy, wherein the motor vehicle 22 to be parked is brought driverlessly to the assigned quick-access parking space 26.

It is provided that an information message 28 is communicated by means of the electronic computing device 24 to the user 18 of the motor vehicle 22 to be parked depending on a decision criterion, wherein the information message 28 proposes to the user 18 a pick-up time 30 determined by the electronic computing device 24, and, once the pick-up time 30 has been accepted by the user 18, the motor vehicle 22 to be parked is brought driverlessly from the quick-access parking space 26 to a long-stay parking space 32.

The term "motor vehicle 22 to be parked" in the present context shall be understood to mean the motor vehicle 22 dropped off by the user 18. The motor vehicle 22 to be parked thus may be parked already, for example, in a quick-access parking space 26 or in a long-stay parking space 32, or may be in the process of being moved driverlessly to one of these parking spaces. The term "motor vehicle 22 to be parked" therefore is not limited to a motor vehicle 22 to be moved driverlessly, and instead describes merely the motor vehicle 22 that has been dropped off by the user 18 in the car park. In the present case, the motor vehicle 22 to be parked is not parked, but is in the process of being parked driverlessly.

In particular, FIG. 1 shows that, with an area of the long-stay parking space 32 the same size as that of the quick-access parking space 26, a larger number of motor vehicles 14, 22 and/or a larger motor vehicle 14, 22 is parked. In other words, it is provided that the motor vehicles 14, 22 are parked closely together in the long-stay parking space 32. It can furthermore be provided that a long-stay parking space 32 of the car park 10 and/or a long-stay parking space 32 externally of the car park 10 is used as a long-stay parking space 32.

FIG. 1 also shows that, as the motor vehicle 22 is brought to a long-stay parking space 32, the motor vehicle 22 to be parked is parked for a minimum parking time above a predefined parking time threshold value. It can furthermore be provided that the pick-up time 30 is proposed to the user 18 only from a specific number of parked motor vehicles 14, 22 in the car park 10 above a number threshold value 44 (FIG. 3). The pick-up time 30 can be proposed for example on the basis of statistical data relating to the available parking spaces depending on time t (FIG. 3). In particular, the statistical data can be determined and evaluated by means of the electronic computing device 24 on the basis of past states of occupancy in the car park 10. Furthermore, it can be provided, in particular, that the motor vehicle 22 to be parked is brought at the pick-up time 30 to the quick-access parking space 26. In particular, the motor vehicle 22 to be parked is available to the user 18 in the quick-access parking space 26 at the pick-up time 30. In the present exemplary embodiment it can be provided, in particular, that the motor vehicle 22 is provided in the pick-up area 20 at the pick-up time 30.

Furthermore, it can be provided, in particular, that a minimum parking time is additionally predefined by the user 18 and, depending on the predefined minimum parking time, it is decided by means of the electronic computing device 24 whether the motor vehicle 22 to be parked is brought to the quick-access parking space 26 or a long-stay parking space 32.

In particular, FIG. 1 thus shows the car park parking system 12, which achieves a maximum utilization of the capacity of the available parking area, for example in an urban environment, wherein an intelligent management system is used here, which allows for the most accurate estimation possible of the pick-up time 30 of the various motor vehicles 14, 22.

The car park 10, which is configured in particular as an automated valet parking car park, is permanently informed of how many parking spaces are currently still available, that is to say the state of occupancy. The capacity utilization is thus monitored continuously. If, for example, at a peak time, for example on a Saturday, the number of free parking spaces in a town center drops below a specific number, a user 18 seeking currently to have their motor vehicle 22 to be parked in the car park 10 parked via the automated valet parking system can then be contacted by the system. Based on the statistical data, detected by the automated valet parking system, relating to the available parking spaces over time t, a specific pick-up time 30 can be presented to the user 18. A specific time t is hereby proposed to the user 18, until which they can leave their motor vehicle 22 to be parked in the car park 10, for example until Monday, 10:00 am. The user 18, for example, receives a bonus for this in the form of parking time or a discount on the parking fee. The number of users 18 contacted is increased or reduced depending on the acceptance of the offer by the user 18. The motor vehicles 14, 22 accepting such an offer or confirming a specific parking time can now be parked by the car park parking system 12 in a less easily accessible area, in particular in the long-stay parking space 32. For example, this can be an adjoining, further car park, in which only motor vehicles 14, 22 parked by the automated valet parking system are parked, moreover in nested fashion, which means that the motor vehicles 14, 22 are parked closely together by the car park parking system 12, so that manual removal from the parking space is no longer possible, since the motor vehicles 14, 22 are arranged closely together and a user 18 can no longer open the vehicle door far enough to enter the vehicle.

Alternatively, the motor vehicles 14, 22 can also be relocated into another, further distant car park. This procedure significantly increases the time required by the car park parking system 12 in order to return the motor vehicle 14, 22 to the handover zone, which corresponds to the pick-up region 20. This is acceptable in this case, however, since the user 18 has entered into a binding agreement regarding the specific pick-up time 30 of the motor vehicle 22 to be parked in the car park 10. It is thus possible for the automated valet parking system to offer additional parking space to further customers at peak times by packing the parking spaces or the parking area more densely and to entice the user 18 to consider this offer by way of an incentivization. The car park parking system 12 continues to monitor the utilization of the capacity of the car park and, following expiry of the deadline agreed with the user 18, arranges for an autonomous re-parking to a quick-access parking space 26, allowing the motor vehicle 22 to be recalled by the user 18 within a matter of minutes.

In addition, a time limit for which the motor vehicle 22 may remain in the car park 10 can be stored by the car park parking system 12 when the motor vehicle 14, 22 is transferred to the automated valet parking system.

In particular, due to the dynamic system and the dynamic offer concept for the user 18, it is possible with the aid of this approach to offer a flexible parking system by means of automated valet parking in which it is not necessary to mandatorily specify a fixed length of stay at the time of handover of the motor vehicle 14, 22 to the car park parking system 12. At the same time, it is possible to respond to peak demand times in a way that is beneficial to all involved.

Figure 2:
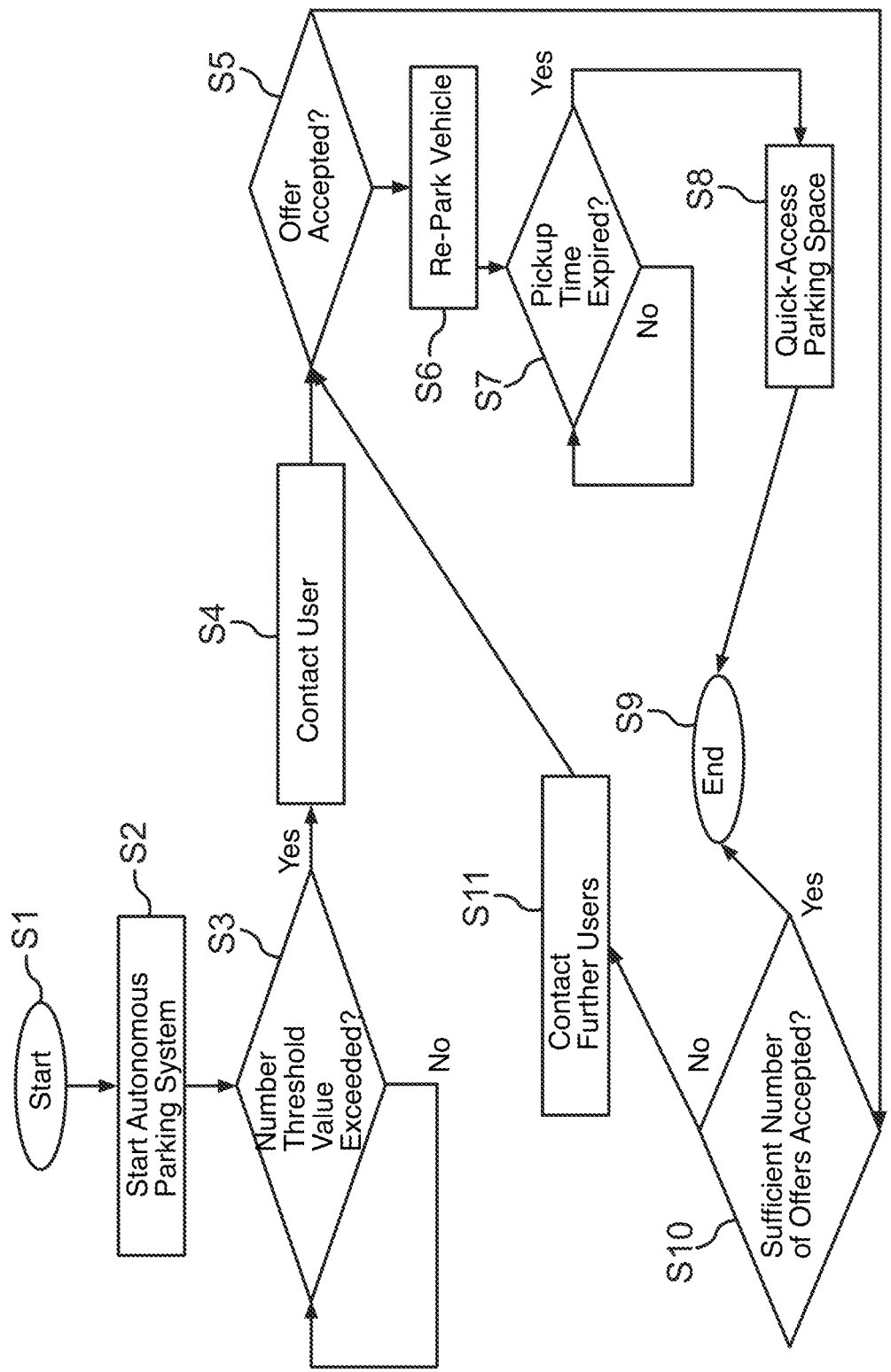
FIG. 2 shows a schematic flow diagram of an embodiment of a method according to the invention.

FIG. 2 shows a schematic flow diagram of an embodiment in accordance with the method. In a first step S1, the method starts. In a second step S2, the start of the autonomous car park parking system 12 begins. In a third step S3 it is checked whether the number threshold value 44 is exceeded. If this is not the case, the method thus remains at the third step S3. If the number threshold value 44 is exceeded, the user 18 is contacted in a fourth step S4. In a fifth step S5 it is checked whether the offer is accepted by the user 18.

Should this be the case, the motor vehicle 22 to be parked is then re-parked in a sixth step S6. In a seventh step S7 it is checked whether the deadline, in other words the pick-up time 30, has expired. Should this not be the case, the method remains at the seventh step S7. Should this be the case, in an eighth step S8 the motor vehicle 22 to be parked is brought to a quick-access parking space 26. In a ninth step S9 the method is ended. Proceeding from the fifth step S5, should the offer not have been accepted by the user 18, it is checked in a tenth step S10 whether the number of offers accepted by further users is sufficient. Should this be the case, the method passes to the ninth step S9. Should this not be the case, further users are contacted in an eleventh step S11, wherein the method then passes form the eleventh step S11 back to the fifth step S5.

FIG. 3 shows a schematic view of three different graphs relating to a time curve t. The time t is plotted on the x-axis 34 of each of the three graphs. The availability of parking spaces is plotted along a first y-axis 36. A mean vehicle return time is plotted on a second y-axis 38. The density of vehicles in the parking area is shown on a third y-axis 40.

A first graph 42 thus shows that, at a predefined time t1, the number of available parking spaces lies below a predefined threshold value. In other words, the specific number of parked motor vehicles 14, 22 in the car park 10 lies above the number threshold value 44 at the time t1. The information message 28 is communicated to the user 18 in particular at the time t1.

The second graph 46 describes, in particular, that, at the time t1, in other words after the information message 28 has been emitted, the number of pick-up vehicles increases. In particular, the mean motor vehicle return time increases at the time t1. In particular, the mean return time increases since a minimum parking time is offered to the user 18, and therefore the mean parking time is increased.

In the third graph 48 it is in turn shown that, after the information message 28, the density of vehicles in the parking area increases, since in particular the motor vehicles 14, 22 are brought to the long-stay parking space 32.

On the whole, FIGS. 1 to 3 show an autonomous vehicle management possibility for automated valet parking systems for optimizing the capacity utilization and parking area.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a car park parking system of a car park for multiple motor vehicles, the method comprising:
    determining, by the car park parking system, a current state of occupancy of the car park;
    assigning a quick-access parking space from multiple parking spaces of the car park to a motor vehicle to be parked depending on the determined current state of occupancy;
    moving, driverlessy, the motor vehicle to be parked to the assigned quick-access parking space;
    communicating, from the car park parking system to a user of the motor vehicle to be parked, an information message depending on a decision criterion,
    wherein the information message proposes to the user a pick-up time determined by the car park parking system, and, following acceptance of the proposed pick-up time by the user, the motor vehicle to be parked is brought driverlessly from the quick-access parking space to a long-stay parking space.

2. The method of claim 1, wherein, when bringing the motor vehicle to be parked to the long-stay parking space, the motor vehicle to be parked is parked for a minimum parking time above a predefined parking time threshold value.

3. The method of claim 1, wherein, an area of the long-term parking space is a same size as an area of the quick-access parking space, and wherein a larger number of motor vehicles or a larger motor vehicle is parked in the area of the long-term parking space.

4. The method of claim 1, wherein the pick-up time is only proposed to the user from a specific number of parked motor vehicles in the car park above a number threshold value.

5. The method of claim 1, wherein the pick-up time is proposed based on statistical data relating to available parking spaces depending on time.

6. The method of claim 5, wherein the statistical data are determined and evaluated based on past states of occupancy in the car park.

7. The method of claim 1, wherein at the pick-up time, the motor vehicle to be parked is brought to the quick-access parking space.

8. The method of claim 1, wherein a minimum parking time is additionally predefined to the user and it is determined, depending on the predefined minimum parking time, whether the motor vehicle to be parked is brought to the quick-access parking space or the long-stay parking space.

9. The method of claim 1, wherein a long-stay parking space within the car park or a long-stay parking space externally of the car park is used as a long-stay parking space.

10. A car park parking system of a car park for multiple motor vehicles, comprising:
    at least one electronic computing device, wherein the car park parking system is configured to
        determine a current state of occupancy of the car park;
        assign a quick-access parking space from multiple parking spaces of the car park to a motor vehicle to be parked depending on the determined current state of occupancy;
        move, driverlessy, the motor vehicle to be parked to the assigned quick-access parking space;
        communicate, to a user of the motor vehicle to be parked, an information message depending on a decision criterion,
        wherein the information message proposes to the user a pick-up time determined by the car park parking system, and, following acceptance of the proposed pick-up time by the user, the motor vehicle to be parked is brought driverlessly from the quick-access parking space to a long-stay parking space.

\* \* \* \* \*